United States Patent [19]

Aspden

[11] Patent Number: 5,101,632

[45] Date of Patent: Apr. 7, 1992

[54] THERMAL RADIATION ENERGY CONVERSION

[76] Inventor: Harold Aspden, Acres High, Hadrian Way, Chilworth, Southampton, S01 7HZ, England

[21] Appl. No.: 600,574

[22] Filed: Oct. 19, 1990

[30] Foreign Application Priority Data

Nov. 16, 1989 [GB] United Kingdom ............... 8925905

[51] Int. Cl.$^5$ .............................................. F03G 7/00
[52] U.S. Cl. ....................................... 60/643; 60/645; 60/698; 60/714; 60/721
[58] Field of Search ............... 60/641.1, 641.6, 641.15, 60/643, 645, 698, 714, 721

[56] References Cited

U.S. PATENT DOCUMENTS 4,002,031 1/1977 Bell .................................. 60/641.15

Primary Examiner—Allen M. Ostrager

[57] ABSTRACT

Thermal energy radiation is converted into another energy form by setting up a temperature differential between two heat sinks forming part of a conventional converter or heat engine, but the warmer heat sink derives its input energy by collecting optically-focused thermal radiation from a primary heat sink within the converter structure. Heat rejected by the cooler heat sink is recycled to the primary heat sink to enhance the thermal efficiency above the Carnot level set by the base temperature conditions. The power rating of the converter is enchanced by combination with a reverse heat engine which elevates the temperature of heat input to the primary heat sink and so the temperature of the radiating surface.

13 Claims, 1 Drawing Sheet

THERMAL RADIATION ENERGY CONVERSION

FIELD OF INVENTION

This invention relates to the conversion of thermal energy into a form that has greater potential for application in powering heat engines subject to the Carnot performance criterion.

By using mirrors or lenses the radiant energy from a thermal source is concentrated to heat or cool the thermal heat sinks which activate a heat engine.

BACKGROUND OF THE INVENTION

By establishing a temperature differential between two heat sinks which interface with a device categorized as a heat engine or its equivalent, it is possible to derive mechanical or electric output power, subject to a limit set by the efficiency of the perfect Carnot cycle.

Boltzmann derived the Stefan-Boltzmann law, by which the rate of heat radiation is proportional to the fourth power of absolute temperature, by deducing the connection between temperature and the energy density of black-body radiation. This involved the conception of an 'aether engine', a Carnot engine without any working substance, driven by the pressure of radiation.

In principle, radiation admitted to a cylinder expands to drive a piston and so does mechanical work as the temperature of the radiation reduces. The temperature reduction is argued on the basis that if work is done and removed as useful output then radiant energy has to flow in to replenish the system at the end of the cycle and this could only occur if the temperature had, in fact, reduced.

Such argument derives from the second law of thermodynamics, but one wonders about that reference to the temperature of radiant energy. We have come to accept that radiation comprises photons having a spectrum of frequencies and do not regard photons as having a temperature. Only radiating matter can be said to have a temperature, usually related to the thermal energy of its molecules via the Boltzmann constant.

Thus radiation has an intensity characteristic of its energy concentration and it has a quality representing its source by virtue of its frequency spectrum. Blackbody radiation from sources of lower temperature contains photons having frequencies which are the same as those from higher temperature sources. It is the distribution of energy as between these different frequencies or the number of photons at a particular frequency which characterizes the temperature of the source. Therefore, if that radiation from the cooler source can be concentrated in some way it can heat an absorbing surface to a higher temperature.

The formal statement of the second law of thermodynamics is very carefully worded to make it clear that heat cannot travel from a cooler body to a warmer body of its own accord, but the intervention of a means for focusing photon energy, as by use of a lens or mirror, or as by the fanciful textbook notion of the intervention of the Maxwell demon can affect that self-accord.

The use of mirrors or lenses to reflect or refract thermal radiation, whether sourced in a heated or cooled surface, was a curiosity in early scientific experiments. Indeed, one such notable experiment was performed by Count Romford in Edinburgh, Scotland, in the year 1800. He repeated the experiment of Pictet, by which the radiation and reflection of cold was demonstrated, to show that objects seated at one focus of a concave mirror could be cooled by a cool object seated at the other focus. See article entitled: 'Pictet's experiment: The apparent radiation and reflection of cold' by J. Evans and B. Popp, American Journal of Physics, vol. 53, p. 737 (1985).

The point about this experiment was that there is heat transfer until there is equilibrium between the radiation exchanged by the two surfaces as governed by the areas of the two surfaces put in juxtaposition by the mirror focusing. The temperatures adjust to keep the radiation in balance, unless some is absorbed and conducted away in the apparatus.

From a technological viewpoint these phenomena are traditionally deemed to be of little consequence, though they do find application in the design of bolometers.

So far as this inventor has been able to ascertain, it has not been foreseen in the prior art that, by combining optics and heat engines and focusing radiation in the manner suggested, the concentration of heat radiation driven at the speed of light can develop temperatures at an absorbing surface which exceed those of the radiating source and can be used to convert heat into engine power. Nor, so far as the inventor is aware, has it been suggested that useful power could be generated by combining a heat engine and an optical system to concentrate heat radiation sourced in a radiating surface which is within the fabricated structure of the converter.

It has been suggested to combine a heat engine and a parabolic mirror, with the flow of heated fluid used to power the engine passing through a tubular heat exchange element at the linear focus of the mirror. Such an arrangement for caputuring solar radiation is disclosed in 'Solar Electric Systems', Hemisphere Publishing Corporation, USA (1984), Editor George Warfield. See paper by Jean-Pierre Causse entitled 'Solar Thermal Power Plants' at pp. 101-113. Also, the paper by Jerald D. Parker entitled 'Components of Solar Thermal Electric Systems' at pp. 89-100 is relevant because it suggests the use of a Stirling engine. However, these specific proposals relate to solar power, that is heat energy sourced in the sun at a temperature of 6,000K. There is no teaching in these prior art disclosures suggesting that the heat engine can be driven by radiation sourced at a temperature that is less than that of the input to the engine.

Indeed, it would not b feasible to power a heat engine from the solar source if the proposals of the subject invention were applied to that purpose, simply because no practical heat engine can be built to operate at that 6,000K temperature.

The subject invention was the basis of a priority filing dated 16 Nov. 1989 and the inventor notes that John Maddox, the Editor of the journal Nature, has had occasion since that date to raise the subject of possible breach of the second law of thermodynamics in his editorial 'Maxwell's Demon Flourishes' (Nature, vol. 345, p. 109; 1990). Also, in this same journal (Nature, vol. 346, p. 802; 1990), there is a report sourced in the Enrico Fermi Institute in Chicago announcing that terrestrial sunlight has been concentrated by a two-stage system including a mirror to an intensity which exceeds that at the surface of the sun.

It is clear, therefore, that by the astute use of mirrors or lenses, two thermally radiating surfaces at different temperatures and of different area can be caused to maintain a state of equilibrium at those temperatures, simply because the same rate of heat is radiated by each surface. The proviso is that the radiation is guided both ways through the optical system so as to be confined to exchanges restricted to those surface areas.

On this basis, since some heat energy can be drawn off by conduction from the hotter surface, one can contemplate radiant transfer of heat from the cooler body to the warmer body, notwithstanding the validity of the second law of thermodynamics as correctly worded. Here the proviso is that heat is continuously extracted from the hotter body via a separate channel and replenishment heat is continuously supplied to the cooler body also via a separate channel. Energy has, of course, to be conserved, a requirement of the first law of thermodynamics.

BRIEF DESCRIPTION OF THE INVENTION

Stated in simple terms, the invention involves the use of optics to concentrate radiant heat and so feed it to a heat sink at a higher temperature. Then a heat engine uses the temperature differential to generate power in a useful non-thermal form. In practical terms the preferred implementation depends upon the ability to build into a system a very large radiating surface area, which in turn demands a miniature form of compact heat engine preferably built into each cell of the system structure. The engine, furthermore, must have a high efficiency as measured relative to the Carnot condition. To enhance the power output in terms of the size of the system, the invention further provides for some sacrifice of overall efficiency, by using a reverse heat engine in an auxiliary capacity to input heat at higher temperature to the radiating surfaces.

According to the invention, a thermally powered energy converter comprises a first heat sink having a surface from which heat is radiated, a second heat sink having a surface at which heat is absorbed, optical focusing means arranged to capture radiation from the radiating surface of the first heat sink and to focus it upon the smaller absorbing surface of the second heat sink, a third heat sink, thermodynamic energy conversion means activated by a temperature differential between the second and third heat sinks and operative to supply a non-thermal power output, means for supplying an inflow of heat energy to the first heat sink and means for extracting heat energy from the third heat sink.

The word 'focus' as used in this specification is intended to mean the general action of a mirror or lens by which it causes radiation reflected by the mirror or refracted by the lens to be concentrated in intensity in being directed onto a receiving surface. A significant degree of concentration requires positioning of the surfaces in relation to the optical system so that the focusing power of the system is utilized, but perfect image focusing is not the essential requisite. Maximum rate of energy transfer from a larger radiating surface area to a smaller radiating surface, as determined by the design criteria, is the objective of the focusing action. The optical focusing means may be a mirror and, in embodiments of the invention designed to operate by reflecting heat radiation from radiating surfaces at temperatures of 500 or 600K, a metal reflector of parabolic section is the preferred implementation. However, depending upon the design temperature and the materials used, the invention can use a lens system for focusing the radiation.

According to a feature of the invention, the means for extracting heat energy from the third heat sink comprises a thermally-conductive connection between the third heat sink and the first heat sink, whereby heat energy exhausted at the lower heat sink temperature of the thermodynamic energy conversion means augments the inflow of heat energy supplied to the first heat sink.

This requires that the third heat sink will be at a slightly higher temperature than the first heat sink, but, since all the action stems from the amplification of temperature differential between the first and second heat sinks owing to the action of the optical system, there is still a temperature differential between the second and third heat sinks.

According to a further feature of the invention, the converter comprises an auxiliary thermodynamic energy conversion means operative as a reverse heat engine and connected to be powered by a portion of said non-thermal power output, this auxiliary thermodynamic energy conversion means operating to preheat fluid conveying the inflow heat to the first heat sink.

The object of this is to sacrifice some efficiency in the generation of useful net power output as measured in terms of the amount of heat circulating in the system, in order to elevate the temperature of the radiating surface. This is a very significant technological factor, where the temperature of the primary source of heat input is low and, for example, close to normal ambient temperature. By doubling the temperature in degrees absolute and sacrificing just over half of the non-thermal power generated to drive the reverse heat engine, the radiation capacity of the surface of the first heat sink can, on the basis of the Stefan-Boltzmann law, be enhanced by a factor of 16. There is then a significant gain in power output capacity for a given area of radiation surface of that first heat sink, notwithstanding the sacrifice of the power drawn by the reverse heat engine.

According to another feature of the invention, the optical focusing means comprises a lens system formed by a curved transparent bounding structure with the space intervening the structure and the heat radiating surface of the first heat sink defining a duct for fluid conveying the inflow heat to the first heat sink.

The lens system may incorporate in the space intervening the bounding structure and the heat radiating surface a transparent liquid, which may be water, arranged to flow via an external heat exchange circuit to carry the inflow heat to the first heat sink.

According to another aspect of the invention, a thermally powered energy converter has a multicell structure having a cross-section which comprises a lattice-like array of converter units, each of which comprises a first heat sink having a surface from which heat is radiated, a second heat sink having a surface at which heat is absorbed, optical focusing means arranged to capture radiation from the radiating surface of the first heat sink and to focus it upon the smaller absorbing surface of the second heat sink, a third heat sink, thermodynamic energy conversion means activated by a temperature differential between the second and third heat sinks and operative to supply a non-thermal power output, means for supplying an inflow of heat energy to the first heat sink and means for extracting heat energy from the third heat sink. Alternatively, instead of each cell of the array comprising a converter unit including its own thermodynamic energy conversion means, such a means may be shared by a plurality of converter units. This applies especially where these conversion means are engines having a working fluid which is subjected to a temperature cycle, rather than solid state 'engines' using the thermoelectric Seebeck effect.

According to a further feature of the invention, the thermodynamic energy conversion means comprise a Stirling-type heat engine shared by a plurality of converter units and operating on heat energy drawn from a gas heated by a second heat sink and rejecting exhaust heat to a third heat sink.

According to a further feature of the invention, the thermodynamic energy conversion means comprise a Stirling-type heat engine shared by a plurality of converter units and operating on heat energy drawn from a gas heated by the second heat sink and rejecting exhaust heat to the third heat sink, which heat is conveyed to the first heat sink by gas flow activated by the cyclic operation of the engine.

According to another alternative feature of the invention, the thermodynamic energy conversion means comprise a thermoelectric element utilizing the Seebeck Effect, there being one such element in each converter unit, the heated surface of the element being the second heat sink and the cooled surface being the third heat sink, heat from which is conveyed by thermal conduction through metal to the first heat sink.

DETAILED DESCRIPTION OF THE INVENTION

It is well known in thermodynamics that, if a temperature differential is maintained between two heat sinks, an engine operating on the Carnot cycle can operate to convert that heat into another form, whether mechanical or electrical, with an efficiency limited to that set by the Carnot efficiency. This is a factor which is the temperature difference divided by the absolute value of the higher temperature involved. In practice, it is possible to achieve as much as 80% of the Carnot efficiency.

Heat engines usually involve fluids which are subject to expansion and compression, but solid-state devices working on the Carnot principle also exist. The latter tend to have lower performance, but it is foreseen that much improved efficiencies will soon be available from thermoelectric devices using the Peltier and Seebeck effects.

On this basis it can be expected that compact, maintenance-free, solid-state thermodynamic energy converters operating at near-to-Carnot efficiencies will soon be commercially available. Indeed, the prototype technology for such thermoelectric devices is already of public record in the published specification of UK Patent Application No. 2,227,881 A. (Corresponding U.S. patent application Ser. No. 439,829).

The Carnot efficiency limitation is set by the temperature of the heat sinks of the thermodynamic energy converter and not by the temperature of the primary heat source. If, therefore, the heat has the form of radiation from a surface replenished by the primary heat source and such radiation can be concentrated by optical focusing, then the higher temperature of the thermodynamic energy converter can be increased. This will give an overall increase in thermal efficiency of the system, meaning that a greater proportion of the heat energy available can be converted into useful energy, whether of mechanical or electrical form.

In the following description the specific form of the thermodynamic energy converters will not be described, but they can be deemed to be planar thermoelectric units operating by the Seebeck or Peltier actions to convert heat into electricity or vice versa if working in reverse heat engine mode. Alternatively, they can be fluid driven heat engines, such as a Stirling engine in which a piston and cylinder system causes air under pressure to be oscillated between a warm heat sink and a cool heat sink, with thermodynamic action allowing mechanical power to be drawn from the piston movement at the expense of heat transfer between the two sinks. The thermoelectric version can have the form described in the above referenced patent application, whereas the Stirling engine can have the form described in the above-referenced paper by Jerald D. Parker.

Figure 1:
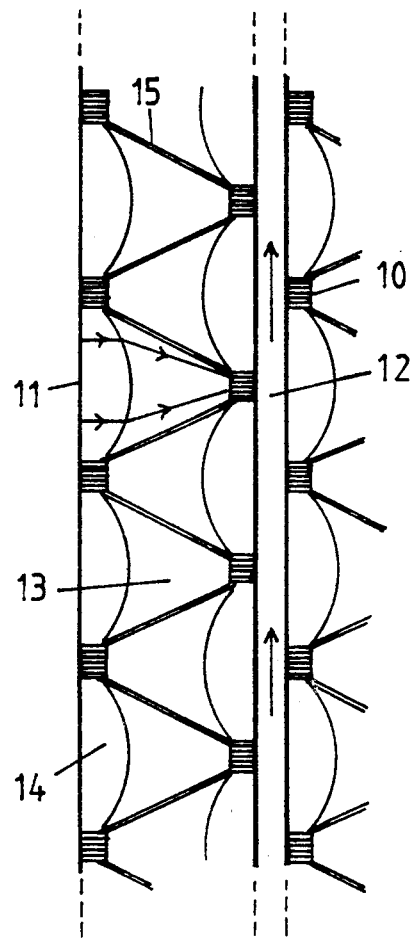
FIG. 1 shows a part-section of a multicell structure in which convex lenses are used to focus heat radiation in an thermoelectric energy converter incorporating the invention.

Referring to FIG. 1, a cross-section of what appears to be a kind of honeycomb structure of a thermally powered system of energy converter units is shown. It comprises numerous planar thermoelectric elements 10 mounted with their lower temperature heat exchange surfaces in contact with heat-conducting metal plates 11, which are assembled mutually parallel in the structure to divide the cross-section into an alternate sequence of two different spatial forms. One such space form constitutes a passage way or duct 12 for fluid at the lower temperature. The other such space form constitutes a heat radiation cavity 13.

Intermediate the elements 10 on the side of the plates 11 within the heat radiation cavities 13 there are lenses 14. These direct radiation emanating from the contact faces of plates 11 on the radiation cavity side to a linear focus centred on the exposed heat exchange surfaces of elements 10. Support struts 15 maintain the spacing between the plates 11 and spacer means (not shown) locate the plates 11 to maintain the spacing defining the ducts 12. To minimize convection and unwanted heat conduction the cavities 13 can be exhausted of air to form a vacuum or partial vacuum, but the pump structure for this is not shown. The struts 15 are of heat insulating material and are of such design that they do not prevent air flow from cell to cell in the cavity and so there is a passage way for air to be pumped from the cavities.

The thermoelectric elements 10 have external electric output leads (not shown) but which are mounted on the plates 11 and connect the various elements 10 in a suitable parallel-series network to suit the voltage/current design requirements of the system.

In operation, input heat is fed to the surfaces of plates 11 by air flow through the ducts 12. Heat radiation from the first heat sink, the surfaces of plates 11 within the cavities 13, is refracted by the lenses 14 and converges at an increasing intensity onto the smaller heat-absorbing surfaces of the elements 10. This heat then passes through the thermoelectric junctions to generate electrical power, some of which is fed as electrical output into the external output power leads, but much of which is rejected as heat at a lower temperature and conducted into the metal of the plates 11.

The convex form of the lenses 14 focuses the radiation to increase its intensity and so elevate the temperature of the absorbing surface. Assuming little heat dissipation by convection, the heat energy absorbed by elements 10 will only be very slightly less than that radiated by the plates 11. The result of this is that the third heat sink, which is defined by the parts of the plate 11 in contact with the elements 10, will be very nearly at the same temperature as the absorbing surface, the second heat sink. This means that so long as heat is supplied via the fluid in the ducts 12, there will be an electrical output from the thermoelectric elements.

Note that this process of heat conversion into electricity is one which recycles the heat not converted into electricity. This means that the overall thermal conversion efficiency can be close to 100%. The power rating, meaning the amount of power that can be produced from a system of a certain size with a given heat input temperature, is affected by the percentage efficiency in relation to the Carnot criterion. The closer the performance of the thermoelectric elements to the Carnot value, the smaller the cyclic iteration sequence and the faster input heat is converted into electricity. Similarly, the stronger the optical concentration and so the temperature enhancement, the smaller the cyclic iteration sequence. The greater the temperature of the heat input, the greater the heat transfer by radiation, by a factor scaled up by the fourth power of absolue temperature. Therefore, the greater the power rating.

Bearing in mind that the thermoelectric converters based on the suggested prototype design can operate at ambient (atmospheric temperatures) with some 70% of Carnot efficiency and with an absorbing heat surface of millimeter width and no more than 3 millimeters in length, one can contemplate multicell structures of lattice dimension of a few centimeters. This means that as many as 1000 cells can be present in a 1 meter square cross-section and a radiating surface acting as what has been termed 'the first heat sink' can be as great as 60 square meters in a cubic meter structure.

Blackbody radiation from 60 square meters at 300K occurs at a rate of 25 kW. If the intensity of this radiant energy is concentrated to 500K at the second heat sink, then, allowing for a 70% of Carnot efficiency of conversion, one has the potential for generating 7 kW output as electricity per cubic meter of converter structure, based on heat input at ambient temperature.

Essential to such performance, however, is that high conversion efficiency in relation to the Carnot criterion plus the availability of technology for building miniature solid-state thermoelectric converters on the scale suggested. This technology is, however, already demonstrably proven and is the subject of the patent applications already referenced.

The structure shown in FIG. 1 can be modified by using plates 11 common to adjacent cavities and eliminating the ducts 12. This saves on space and allows even more compact design and so enhanced power rating. However, to input the heat energy in this case, the lenses 14 can be formed as an acrylic Fresnel lens defining a fluid duct between the lens and the radiating surface of the plate 11. Air could then flow through the lens structure to sustain the temperature of plates 11. Alternatively, the lens could rely mainly on the refractive index of a liquid, such as water, and a flow of this liquid through such a duct could be the means for heat input.

Figure 2:
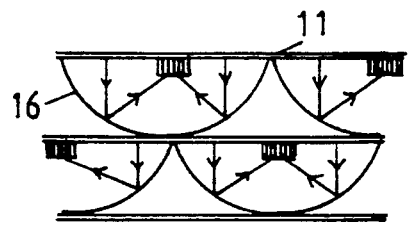
FIG. 2 shows a part-section of a multicell structure in which concave mirrors are used to focus heat radiation in a thermoelectric energy converter intended to operate at higher temperatures than are applicable in FIG. 1.

A preferred implementation of the invention is one which uses concave parabolic mirrors with the thermoelectric elements at the linear focus. Two complete cell units and two halves of cell units of such a structure are shown in FIG. 2. Here the space between the back of concave mirrors 16 and metal plates 11 defines the ducts or passage ways through which a fluid flows to supply heat to the plates. The radiation flows as shown by the arrowed lines and heats the surface of the thermoelectric elements 10 to generate electricity as already described by reference to FIG. 1.

Note, however, that a multicell structure can be constructed using metal reflectors as parabolic mirrors and these can be assembled back to back to define the ducts for heating fluid, and the heat can be conducted through the metal of the reflectors to the radiating surfaces. This configuration is not shown in the drawings, because the operability of such an alternative embodiment of the invention is deemed evident from what has already been described.

Figure 3:
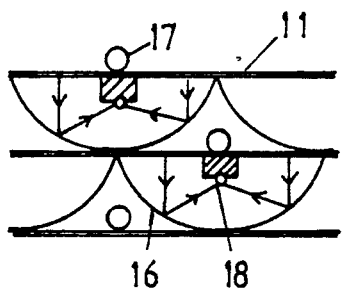
FIG. 3 shows a part-section of a multicell structure in which concave mirrors are used to focus heat radiation in an energy converter using an external heat engine for power generation.

The invention does extend to the use of conventional heat engine technology as the means for generating power output from the radiant heat collected from the optical focusing. In this case, as shown in FIG. 3, the thermoelements 10, which are elongated structures extending the full length of the main converter structure at right angles to the cross-sections shown in FIGS. 1 and 2, can be replaced by small bore copper pipes mounted on plates 11 but heat-insulated from those plates by their supports and by appropriate shielding. Similarly, the heat input, instead of being supplied via the ducts formed between the mirrors and plates 11 could be provided by fluid flow through small bore copper pipes mounted in good heat conducting contact on the opposite face of plates 11, but otherwise heat-insulated to minimize convection if not part of an evacuated structure.

FIG. 3 shows a modified version of FIG. 2 including pipework. Copper pipes 17 brings heat into the system and copper pipes 18 takes heat from the system. These pipes connect to an external heat engine which uses the heat supplied to power the engine and returns back to the converter system, as input heat, the lower grade heat rejected by the engine plus some additional heat supplied to replenish any converted into electricity or mechanical power output.

To enhance the power generating capacity of a system using the invention, it is desirable to operate at higher temperatures, because heat radiation is proportional to the fourth power of absolute temperature. If the heat source is low grade but abundant and freely available, such as a geothermal water source, then efficiency of energy conversion is primarily related to the more effective use of an installation and its capital expense. As already stated, it then becomes feasible to operate a heat engine in reverse mode with the object of elevating the operating temperature of the system. Then some of the power produced has to be deployed into powering the reverse heat engine.

If such higher temperatures are used the structure of FIG. 2 or 3 has advantages because of the possibility of its fabrication by use of metal and ceramics to the exclusion of liquids or plastic materials, which can feature in the structure of FIG. 1.

Figure 4:
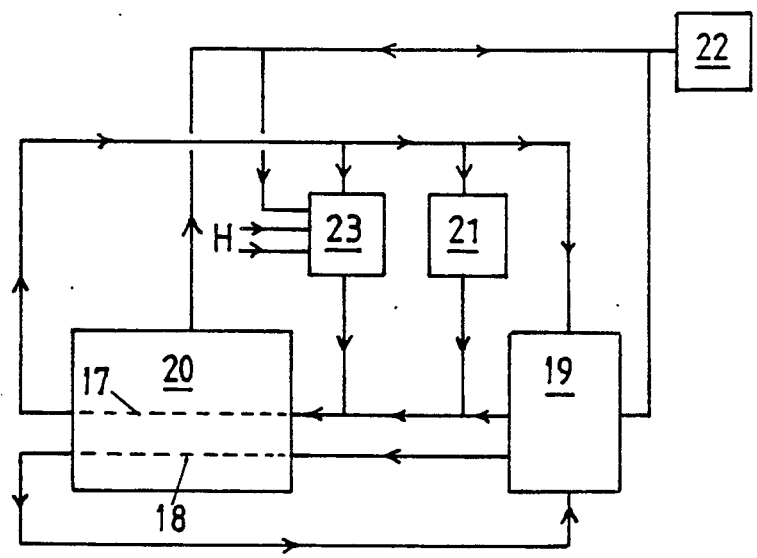
FIG. 4 shows a schematic system in which the energy converter operates in conjunction with a reverse heat engine.

A schematic system using a reverse heat engine is depicted in FIG. 4. This diagram is used to depict operation based on a thermoelectric converter implementation or an implementation in which non-thermal output power is generated by a conventional heat engine, such as by Stirling engine. The main converter including the optical focusing means is denoted 20. The system shown includes a heat store 21. If the main power output is produced by the thermoelectric elements such as 10 in FIG. 1, then the converter 20 includes such elements and produces electrical power supplied as shown along a cable connected to the external power system 22. Alternatively, if the main power output is produced, for example, by a Stirling engine 19, the electrical power output supplies the external power system 22. In either case, however, the system shown depends upon the operation of the reverse heat engine 23, which is either powered by electrical power drawn from the power cable feeding the system 22 or could be powered by a mechanical coupling (not shown) linking the Stirling engine 19 and the engine 23.

The reverse heat engine 23 may be of any conventional form, provided it has a high near-to-Carnot efficiency. Its role is to take heat input from a low grade heat source (denoted as heat input H) and bring this up to a much higher temperature. This heat at an elevated temperature is fed as output by a suitable fluid flow means to provide input heat to the first heat sink in the converter system 20. Thus such heat is supplied to the metal plates 11 in FIGS. 1, 2 or 3, which are part of the structure of system 20.

If the FIG. 3 construction is used, the heat inflow is via fluid, e.g. hot air, supplied through pipes 17. In FIG. 4 these pipes are common to three circulating loops, one passing through a heat exchange system in the Stirling engine 19, one passing through the heat store 21 and one passing through a heat exchange system in the reverse heat engine 23. The temperature of the fluid flowing in these circuits is that of the first heat sink of converter 20. A single loop circuital flow connects the converter 20 and the Stirling engine 19. This flow through pipes 19 involves the fluid, e.g. hot air, which is at the high working temperature produced by focusing the radiation inside converter 20, that is, the temperature of the second heat sink. The lower temperature heat exchange in the Stirling engine 19 occurs at what is termed in the claims as the 'third heat sink' and such rejected heat is conveyed by the circulating fluid to the first heat sink in converter 20 by the pipes 17.

The output of the system 20, which incorporates the features of the invention already described, is either heat at an even higher temperature carried by a fluid flow or electricity supplied by the thermoelectric elements. Heat output could be supplied for use as heat, as for support of some chemical process, for example, or, in the system under discussion, fed as input to the heat engine 19. Any heat rejected from the engine 19 at the lower temperature matching that of the elevated heat output from reverse heat engine 23 is combined with that reverse heat engine to be fed back as input to the converter system 20.

Such a system would not be technologically practical were it not for the ability to construct a multicell structure incorporating miniature cells of centimeter dimensions, each associated with its own warm and cool heat sinks, the temperature differential of which powers the system. For this reason the preferred implementation of the invention is one which builds on the technology of the thermoelectric invention, which is the subject of the above-referenced patent applications.

To understand the benefits of the mode of implementing the invention using the reverse heat engine combination, consider one practical implementation which input heat at 300K and uses the reverse heat engine to enhance this to 500K.

Note first, however, that what is at issue is not the overall thermal efficiency, which has to be virtually 100% with the recycling feature, but rather the scale or power rating of a particular system.

500K is the temperature of the first heat sink or radiating surface. The optical focusing system concentrates the intensity of this radiation by a factor of 20, corresponding to the ratio of the radiating surface to that of the absorbing surface. In consequence the temperature of that second heat sink, or absorbing surface, is, say, 800K. The loss of energy by reradiation is then, in theory, 33% of the incident radiation, owing to the fourth power effect of temperature on a surface 5% of that of the primary radiation source. Therefore, assuming perfect blackbody radiation, 67% of the source energy can be deployed in a single throughput cycle to power the heat engine or the thermoelectric converter.

The latter rejects energy at the 500K temperature and so it has an ideal Carnot efficiency of 37.5%, but, in practice, its efficiency is 27%. This is energy converted into useful work, such as electricity or mechanical power and some of this is needed to power the reverse heat engine. For each unit of heat energy supplied at 500K, the input power to that reverse heat engine is 0.5 units, assuming an 80% of Carnot efficiency of performance. All of the input unit of heat eventually finds its way to the 800K level via the concentration of the optical system, because reradiated energy cannot degrade below the 500K level inside the structure.

Therefore, since 67% of 27% of the energy radiated from the 500K surface converts into useful work, with the rest being recycled, half or 9% of the radiated energy is available as net power output after supplying the reverse heat engine. Whatever the radiation capacity of that 500K surface, only 9% of that radiated power can contribute to the power rating of the system.

Given the 60 square meter radiating surface in a cubic meter structure, as already specified, and noting that blackbody radiation at 300K is 25 kW from such an area, there is potentially a radiation rate of 164 kW at 500K. With a 9% overall conversion rate into electricity or other form of useful net power output, this is approximately a 15 kW rating for a cubic meter of structure. This may seem a large structure to generate a mere 15 kW but it is generated from low grade heat deemed to be at the ambient temperature level of 300K and the advantages of the invention have to be measured in terms of the saving of reliance on fossil fuel.

The above are not optimum design data, because higher efficiency can be achieved by operating with a higher temperature differential in the reverse heat engine stage and the economics of the conversion into electricity depend upon the cheapness of mass fabrication of the miniature thermoelectric elements. Also, there are advantages not found in conventional power generating systems, in that when output non-thermal power surplus to demand is being generated it can be converted into heat in the reverse heat engine stage and stored as heat in the heat store 21 for later use at times of peak load. This relieves the electrical power feedback to the reverse heat engine at such times and so makes the counter-productive combination of heat engine and reverse heat engine, not just a means for enhancing radiation temperatures and so power rating, but also a means for matching that rating to variable load conditions.

I claim:

1. A thermally powered energy converter comprising a first heat sink having a surface from which heat is radiated, a second heat sink having a surface at which heat is absorbed, optical focusing means arranged to capture radiation from the radiating surface of the first heat sink and to focus it upon the smaller absorbing surface of the second heat sink, a third heat sink, thermodynamic energy conversion means activated by a temperature differential between the second and third heat sinks and operative to supply a non-thermal power output, means for supplying an inflow of heat energy to the first heat sink and means for extracting heat energy from the third heat sink.

2. A thermally powered energy converter according to claim 1, wherein the means for extracting heat energy from the third heat sink comprises a thermally-conductive connection between the third heat sink and the first heat sink, whereby heat energy exhausted at the lower heat sink temperature of the thermodynamic energy conversion means augments the inflow of heat energy supplied to the first heat sink.

3. A thermally powered energy converter according to claim 1, comprising an auxiliary thermodynamic energy conversion means operative as a reverse heat engine and connected to be powered by a portion of said non-thermal power output, this auxiliary thermodynamic energy conversion means operating to preheat fluid conveying the inflow heat to the first heat sink.

4. A thermally powered energy converter according to claim 1, wherein the optical focusing means comprises a lens system formed by a curved transparent bounding structure with the space intervening the structure and the heat radiating surface of the first heat sink defining a duct for fluid conveying the inflow heat to the first heat sink.

5. A thermally powered energy converter according to claim 4, wherein the lens system incorporates in the space intervening the bounding structure and the heat radiating surface a transparent liquid arranged to flow via an external heat exchange circuit to carry the inflow heat to the first heat sink.

6. A thermally powered energy converter according to claim 1, wherein the optical focusing means comprises a mirror system formed by a curved reflecting structure with the space intervening the non-reflecting surface of the structure and the heat radiating surface of the first heat sink defining a duct for fluid conveying the inflow heat to the first heat sink.

7. A thermally powered energy converter according to claim 1, wherein the optical focusing means comprises a mirror system formed by a curved metal reflecting structure with the space bounded by surfaces including the non-reflecting surface of the structure defining a duct for fluid conveying the inflow heat to the first heat sink, the metal reflecting structure being in heat conducting relationship with the heat radiating surface of the first heat sink.

8. A thermally powered energy converter incorporating a multicell structure having a cross-section which comprises a lattice-like array of converter units, each of which comprises a first heat sink having a surface from which heat is radiated, a second heat sink having a surface at which heat is absorbed, optical focusing means arranged to capture radiation from the radiating surface of the first heat sink and to focus it upon the smaller absorbing surface of the second heat sink, a third heat sink, thermodynamic energy conversion means activated by a temperature differential between the second and third heat sinks and operative to supply a non-thermal power output, means for supplying an inflow of heat energy to the first heat sink and means for extracting heat energy from the third heat sink.

9. A thermally powered energy converter incorporating a multicell structure having a cross-section which comprises a lattice-like array of converter units, each of which comprises a first heat sink having a surface from which heat is radiated, a second heat sink having a surface at which heat is absorbed, optical focusing means arranged to capture radiation from the radiating surface of the first heat sink and to focus it upon the smaller absorbing surface of the second heat sink and a third heat sink, the converter further comprising thermodynamic energy conversion means, shared by a plurality of converter units, which energy conversion means are activated by a temperature differential between the second and third heat sinks and are operative to supply a non-thermal power output, there being means for supplying an inflow of heat energy to each of the first heat sinks and means for extracting heat energy from each of the third heat sinks.

10. A thermally powered energy converter according to claim 9, comprising a Stirling-type heat engine shared by a plurality of converter units and operating on heat energy drawn from a gas heated by a second heat sink and rejecting exhaust heat to a third heat sink.

11. A thermally powered energy converter according to claim 9, comprising a Stirling-type heat engine shared by a plurality of converter units and operating on heat energy drawn from a gas heated by a second heat sink and rejecting exhaust heat to a third heat sink, which heat is conveyed to the first heat sink by gas flow activated by the cyclic operation of the engine.

12. A thermally powered energy converter according to claim 8, wherein the thermodynamic energy conversion means include thermoelectric elements utilizing the Seebeck effect, there being one such element in each converter unit, the heated surface of the element being the second heat sink and the cooled surface being the third heat sink, heat from which is conveyed by thermal conduction through metal to the first heat sink.

13. A thermally powered energy converter comprising, in combination, a converter system supplying non-thermal power output, a heat store and an auxiliary thermodynamic energy conversion means powered by at least some of said non-thermal power output to generate heat, the converter system comprising a first heat sink having a surface from which heat is radiated, a second heat sink having a surface at which heat is absorbed, optical focusing means arranged to capture radiation from the radiating surface of the first heat sink and to focus it upon the smaller absorbing surface of the second heat sink, a third heat sink, primary thermodynamic energy conversion means activated by a temperature differential between the second and third heat sinks and operative to supply said non-thermal power output, including a residual output for use external to the converter, said auxiliary thermodynamic energy conversion means being operative as a reverse heat engine operating to preheat fluid conveying the inflow heat to the first heat sink and there being means for extracting heat energy from the third heat sink and feeding this into the heat store, which provides a reserve source of heat used to supplement the inflow of heat to the first heat sink.

* * * * *